Aug. 16, 1932.    W. L. AVERY    1,872,615
FLUID OPERATED FRICTION BRAKE
Filed Jan. 30, 1930    3 Sheets-Sheet 1
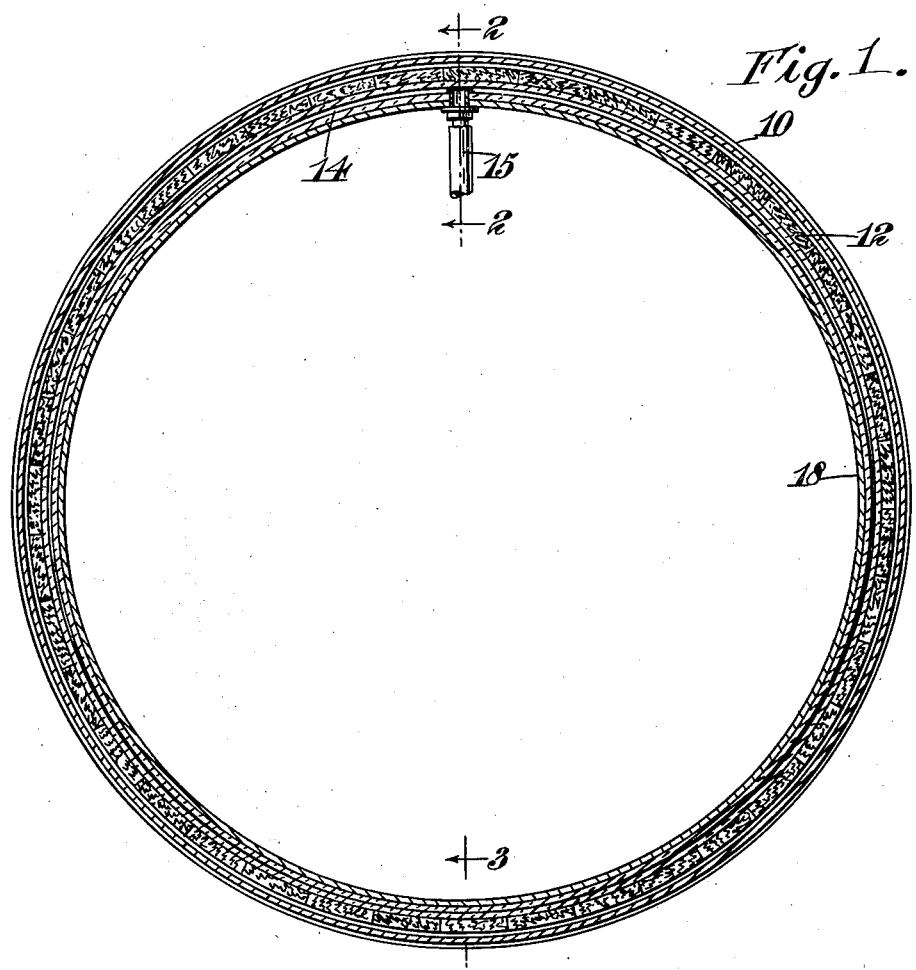
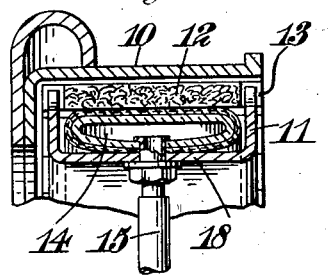
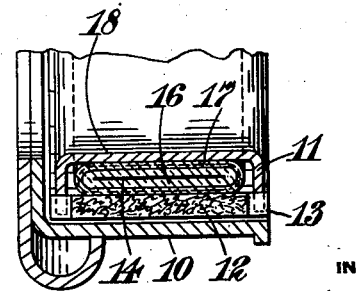
INVENTOR
William Leicester Avery
By Byrnes, Stebbins, Parmelee & Blenko
his Attys.

Aug. 16, 1932.  W. L. AVERY  1,872,615
FLUID OPERATED FRICTION BRAKE
Filed Jan. 30, 1930  3 Sheets-Sheet 2
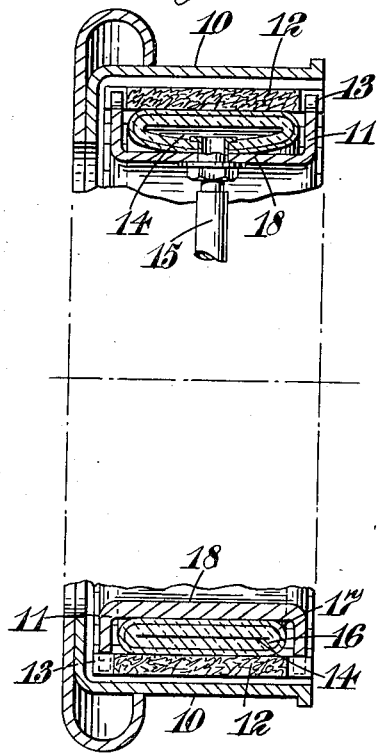
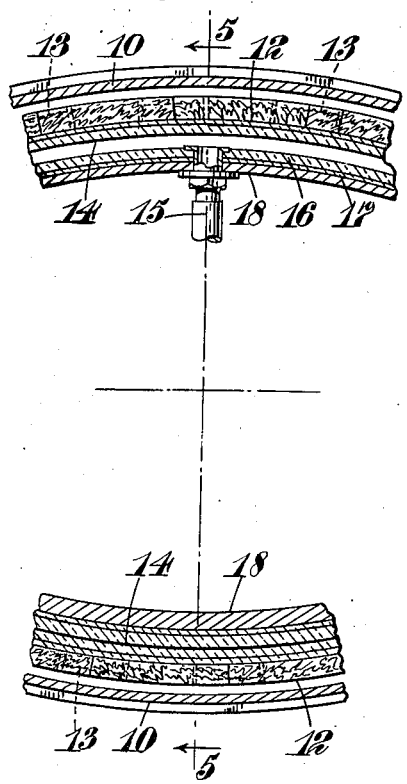
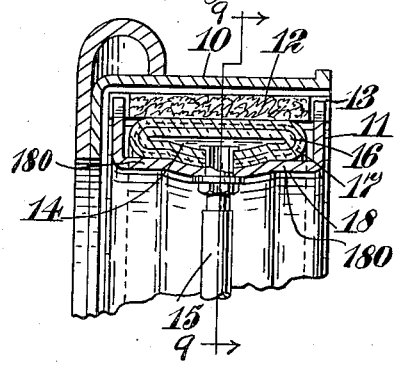

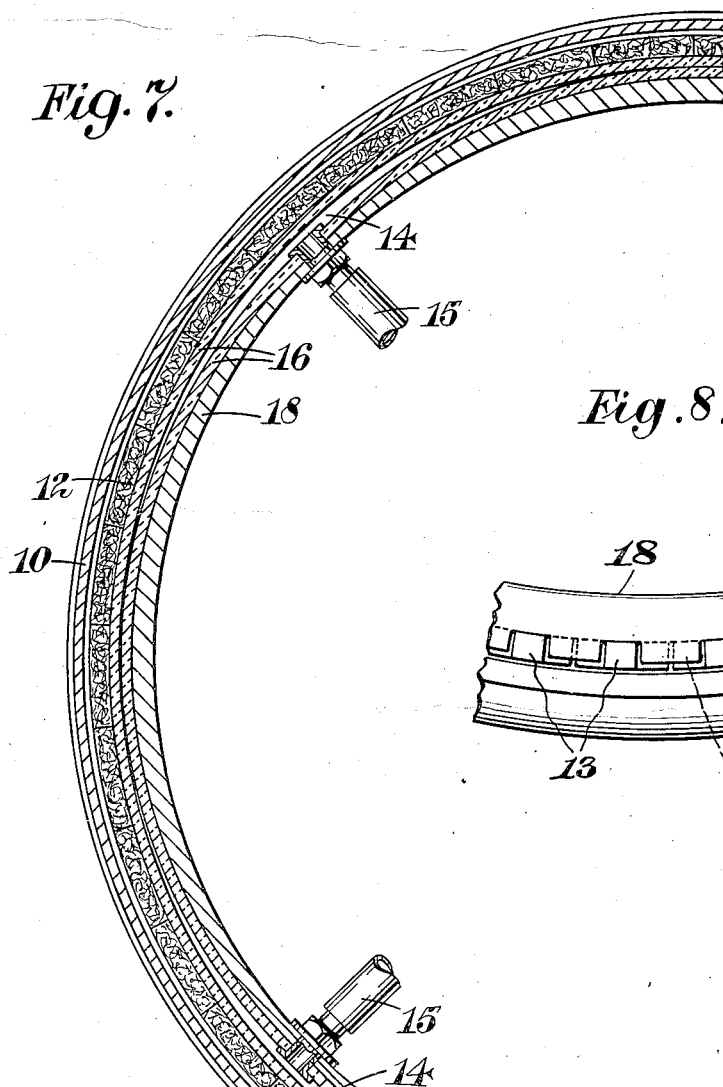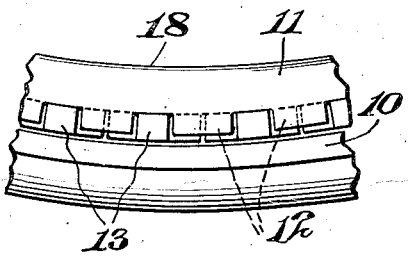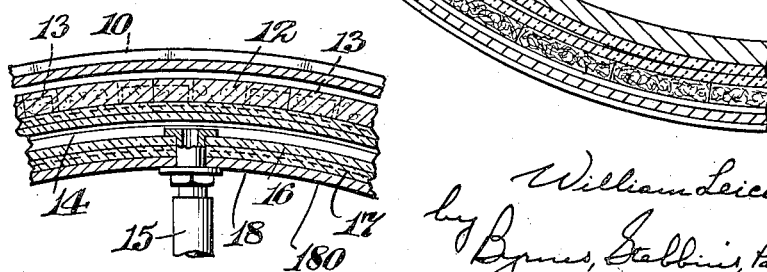

Patented Aug. 16, 1932

1,872,615

UNITED STATES PATENT OFFICE

WILLIAM LEICESTER AVERY, OF LONDON, ENGLAND, ASSIGNOR TO THE INDIA RUBBER GUTTA PERCHA AND TELEGRAPH WORKS COMPANY LIMITED, OF LONDON, ENGLAND, A BRITISH COMPANY

FLUID OPERATED FRICTION BRAKE

Application filed January 30, 1930, Serial No. 424,587, and in Great Britain August 24, 1929.

The present invention is for improvements in or relating to fluid operated friction brakes and is particularly applicable to the brakes of aircraft landing wheels.

The type of fluid operated friction brake to which the present invention is applicable is that comprising a brake shoe and an inflatable bag having one or more outlets for release of the inflating fluid mounted between said shoe and a fixed reaction member to thrust the shoe into engagement with a moving surface to be braked. This is the type of brake referred to herein and in the appended claims.

According to the present invention a brake of the type specified is characterized in that the inflatable bag and its reaction member are so shaped that when the bag is in its deflated condition its opposed walls in the immediate neighborhood of a fluid outlet are further apart than are the walls at other parts of the bag.

Means may be provided for preventing the wall of the bag that is opposite an outlet from closing said outlet.

In one form, the invention comprises a bag of annular tubular form supported on its inner side by a member having a cylindrical surface, and is characterized by a channelled recess formed in said surface in the neighborhood of a fluid outlet for the passage of fluid thereto when that part of the tube is collapsed.

In another form of the invention the parts are so shaped that the separation of opposed walls when the tube is deflated decreases continuously from an outlet to a position removed therefrom. In the case where there is only one outlet the separation will decrease continuously in each direction from the outlet to some other point on the tube. The point of minimum separation may if desired be midway between consecutive outlets; or in the case of a bag of annular form having a single outlet it may be diametrically opposite to said outlet.

The graduation of the separation of opposed walls of the tube may be effected either by graduating the thickness of the material of the tube or by graduating the depth of the channel in which it lies. In the latter case the bottom wall of the channel will either have to be of graduated thickness or its interior face will have to be mounted eccentrically with respect to the wheel. The latter construction will in general be preferable for aeroplane wheels in which lightness is a primary consideration.

In order that the invention may be more readily understood a specific example and modifications thereof will now be described with reference to the accompanying drawings in which:

Figure 1 is a section in a central plane transverse to the axis of a brake embodying the invention.

Figure 2 is a section on the line 2—2 of Figure 1.

Figure 3 is a section on the line 3—3 of Figure 1.

Figure 4 is an enlarged view similar to the top and bottom parts of Figure 1 of a modified form of the brake.

Figure 5 is a section on the line 5—5 of Figure 4.

Figure 6 is a view similar to Figure 2 of a further modified form of the brake.

Figure 7 is a section in a central plane transverse to the axis of part of a brake having several outlets.

Figure 8 is an elevation looking from the right-hand side of the portion of the brake shown in Figure 3.

Figure 9 is a section on the line 9—9 of Figure 6 looking in the direction of the arrows.

Like reference numerals indicate like parts in all the figures.

The brake illustrated is intended for use on the landing wheels of aircraft. The brake is mounted within, and acts upon, a brake drum 10 and comprises an annular support 11 of channel section in which the other parts are mounted.

The frictional braking force is provided by a number of brake shoes 12 occupying the open side of the channel. These shoes are of rectangular form and have axial projections 13 extending through radial slots or castellations formed in the peripheries of the side walls of the channel. This will be seen more clearly from Figure 8. These projections do not hinder movement of the shoes radially outwards but prevent any circumferential movement thereof.

In the space between the shoes and the channel support is situated an annular inflatable tube 14 having an outlet pipe 15 passing through the base of the channel at one portion of its periphery. The walls of this tube consist of two layers 16 and 17, though for simplicity only one is shown in Figure 1. The inner layer 16 which is of rubber serves to prevent leakage of pressure fluid while the outer layer 17, which is composed of fabric serves as reinforcement. Moreover the inner faces of the brake shoes may be secured, for example by vulcanization, to the outer surface of the outer layer of the tube. In this way when the fluid is sucked out of the tube the brake shoes will be retracted to an inoperative position.

The apparatus as described so far is known.

The chief difficulty experienced with a brake of this kind, and which it is the object of the present invention to eliminate, is that when the tube is allowed to collapse, and particularly when it is forced to do so by suction applied to the fluid outlet, the part near the outlet collapses first and closes the outlet. It is desirable that as far as possible the tube should collapse completely so as to waste no space and keep the brake as small and as light as possible in relation to its braking power. This is particularly important in the case of brakes for aircraft.

This difficulty is avoided in the constructions shown in Figures 1–5 by graduating the radial depth of the space between the bottom of the channel and the inner faces of the brake shoes so that it is a maximum adjacent to the outlet and a minimum at a position diametrically opposite thereto. At the latter position the tube will collapse completely when the brake shoes are retracted while at the former position there will be a space between the opposed walls of the tube. A limit is set to the retraction of the shoes by the engagement of the projections 13 with the bottoms of the slots or castellations.

In the construction shown in Figures 1–3 the bottom 18 of the channel is of uniform thickness so that it will be necessary to mount its inner surface eccentrically with respect to the brake drum.

This is avoided in Figure 5 by graduating the thickness of the bottom of the channel. The eccentricity shown in the figures is considerably exaggerated and would in fact be quite small. Probably, however, the construction shown in Figures 1–3 will be preferable on the ground of lightness since in Figure 5 the thickness at the thinnest point must be adequate and at other points will in general be unnecessarily great.

In the construction shown in Figure 6 only a portion of the width of the channel is deepened. In this case the bottom of the channel is of uniform thickness but on either side of the middle, at the areas 180, its inner surface is flat in cross-section and is made concentric with the brake drum 10.

In the construction shown in Figure 7, there are several outlets 15. In this case the position of minimum separation of the opposed walls 16 is midway between the consecutive outlets. Figure 9 is a section on the line 9—9 of Figure 6 in a plane parallel to the drum 10 and passing through the inlet 15, thus showing the construction more clearly.

I claim:

1. A fluid operated friction brake comprising a plurality of brake shoes arranged round a circle, a fixed reaction member and an inflatable bag, whereof the bag is of annular tubular form, has a plurality of outlets for release of the inflating fluid and is mounted between said shoes and said reaction member to thrust the shoes into frictional engagement with a moving surface to be braked, and the reaction member and the bag are so shaped that when the bag is in its deflated condition the separation of the walls of the tube decreases continuously from each outlet to a position midway between it and an adjacent outlet.

2. A fluid operated friction brake comprising a plurality of brake shoes arranged round a circle, a fixed reaction member and an inflatable bag, whereof the bag is of annular tubular form, has a single outlet for release of the inflating fluid and is mounted between said shoes and said reaction member to thrust the shoes into frictional engagement with the moving surface to be braked, and the reaction member and the bag are so shaped that when the bag is in its deflated condition the separation of its walls decreases continuously considered circumferentially from said outlet to a position diametrically opposite thereto.

3. A fluid operated friction brake comprising a plurality of brake shoes arranged round a circle, a fixed reaction member and an inflatable bag, whereof the bag is of annular tubular form and has a wall of substantially uniform thickness and at least one outlet for release of the inflating fluid, and is mounted between said shoes and said reaction member to thrust the shoes into frictional engagement with a moving surface of a brake drum to be braked, and the reaction member has a cylindrical surface to support the inner side of the bag which surface has its axis parallel to that of the brake drum and removed therefrom in a direction away from the outlet.

4. A fluid operated friction brake comprising a plurality of brake shoes arranged round a circle, a fixed reaction member and an inflatable bag, whereof the bag is of annular tubular form, is of substantially uniform thickness, has at least one outlet for release of the inflating fluid and is mounted between said shoes and said reaction member to thrust the shoes into frictional engagement with a moving surface of a brake drum to be braked, and the reaction member consists of an annular support of channel section whereof the bottom is a cylinder of uniform thickness to be mounted eccentrically with respect to the brake drum.

5. A fluid operated friction brake comprising a plurality of brake shoes arranged round a circle, a fixed reaction member and an inflatable bag, whereof the bag is of annular tubular form, is of substantially uniform thickness, has at least one outlet for release of the inflating fluid and is mounted between said shoes and said reaction member to thrust the shoes into frictional engagement with a moving surface of a brake drum to be braked, and the reaction member consists of an annular support of channel section whereof the bottom has inner and outer cylindrical surfaces eccentric with respect to each other and the inner surface is to be mounted coaxially with respect to the brake drum.

6. A fluid operated friction brake comprising a brake shoe, a fixed reaction member and an inflatable bag, whereof the bag has at least one outlet for release of the inflating fluid and is mounted between said shoe and said reaction member to thrust the shoe into frictional engagement with a moving surface to be braked, and the reaction member and the bag are so shaped that considered in a plane parallel to the direction of movement of the shoes, when the bag is in its deflated condition its opposed walls in the immediate neighborhood of a fluid outlet are further apart than are the walls at other parts of the bag that are spaced circumferentially from the outlet.

7. A fluid operated friction brake comprising a plurality of brake shoes arranged round a circle, a fixed reaction member and an inflatable bag, whereof the bag is of annular tubular form, has at least one outlet for release of the inflating fluid and is mounted between said shoe and said reaction member to thrust the shoes into frictional engagement with a moving surface to be braked, and the reaction member has a cylindrical surface to support the inner side of the tube and in said surface a channeled recess in the neighborhood of a fluid outlet to provide a free passage for fluid from the tube to the outlet when that part of the tube above the outlet is deflated.

8. A fluid operated friction brake comprising a plurality of brake shoes arranged round a circle, a fixed reaction member and an inflatable bag whereof the bag is of annular tubular form, has at least one outlet for release of the inflating fluid and is mounted between said shoes and said reaction member to thrust the shoes into frictional engagement with a moving surface to be braked, and the reaction member and the bag are so shaped that when the bag is in its deflated condition the separation of its opposed walls decreases continuously in a circumferential direction from an outlet to a position removed therefrom.

9. A fluid operated friction brake comprising in combination a brake shoe, a fixed reaction member, an inflatable bag attached to the shoe and mounted between said brake-shoe and said reaction member to thrust the shoe into frictional engagement with a moving surface to be braked, an outlet for release of the inflating fluid which outlet is situated in a wall of the bag remote from the brake-shoe, and a guide for the brake-shoe so that when the bag is deflated the wall to which the shoe is attached is in the immediate neighborhood of the fluid outlet, held away from the wall in which the fluid outlet is located.

10. A fluid operated friction brake comprising in combination a fixed reaction member comprising an annular support of channel section, a plurality of brake-shoes arranged round the support and extending transversely across the side walls thereof, an inflatable bag of annular tubular form attached to the shoes and mounted between said brake-shoes and said reaction member to thrust the shoes into frictional engagement with a moving surface to be braked, an outlet for release of the inflating fluid which is situated in a wall of the bag remote from the brake-shoes, and guide slots in the side walls of the channel to receive the ends of the brake-shoes wherein the depths of the slots are such that when the bag is deflated the shoes in the immediate neighborhood of the fluid outlet hold the attached wall of the collapsible bag clear of said fluid outlet.

11. A fluid operated friction brake comprising in combination a fixed reaction member comprising a support of channel section, a brake-shoe extending transversely across the side walls thereof, an inflatable bag attached to the shoe and mounted between said shoe and said reaction member to thrust the shoes into frictional engagement with a moving surface to be braked, an outlet for release of the inflating fluid which outlet is situated in a wall of the bag remote from the brake-shoe and guide slots in the sides of the channel to receive the ends of the brake-shoe, wherein the depths of the slots are such that when the bag is deflated the wall to which the shoe is attached is, in the immediate neighborhood of the fluid outlet, held away from the wall in which the fluid outlet is situated.

12. A fluid operated friction brake comprising in combination a moving surface of a brake drum to be braked, a fixed reaction member comprising an annular support of channel section, a plurality of brake shoes arranged round a circle and extending transversely across the side walls thereof, an inflatable bag of annular tubular form attached to the shoes and mounted between said brake-shoes and said reaction member to thrust the shoes into frictional engagement with the brake-drum, an outlet for release of the inflating fluid which outlet is situated in a wall of the bag remote from the brake-shoes and guide slots formed in the side walls of the channels to receive the ends of the brake-shoes, wherein the depths of the guide-slots are such that when the bag is deflated the shoes in the immediate neighborhood of the fluid outlet hold the attached wall of the collapsible bag clear of said fluid outlet and wherein the bottom of the guide-slots for the brake-shoes lie on a circle that is concentric with the brake-drum.

13. A fluid operated friction brake, a moving surface of a brake drum to be braked, a fixed reaction member comprising an annular support of channel section whereof the reaction surface is eccentric with respect to the brake-drum, a plurality of brake-shoes arranged round a circle and extending transversely across the side walls of the channelled support, an inflatable bag of annular tubular form attached to the shoes and mounted between said brake-shoes and said reaction member to thrust the shoes into frictional engagement with the brake-drum, an outlet for release of the inflating fluid which outlet is situated in a wall of the bag remote from the brake-shoes, and guide-slots formed in the side walls of the channels to receive the ends of the brake-shoes, wherein the depths of the guide-slots are such that when the bag is deflated the shoes in the immediate neighborhood of the fluid outlet hold the attached wall of the fluid outlet clear of said fluid outlet and wherein the bottoms of the guide slots for the brake-shoes lie on a circle that is concentric with the brake-drum.

In testimony whereof I affix my signature.

WILLIAM LEICESTER AVERY.